United States Patent [19]

Rutschmann

[11] Patent Number: 4,641,610

[45] Date of Patent: Feb. 10, 1987

[54] AIR INTAKE SYSTEM OF A MULTICYLINDER INTERNAL COMBUSTION ENGINE

[75] Inventor: Erwin Rutschmann, Bad Herrenalb, Fed. Rep. of Germany

[73] Assignee: Dr. Ing. h.c.F. Porsche Aktiengesellschaft, Fed. Rep. of Germany

[21] Appl. No.: 709,432

[22] Filed: Mar. 7, 1985

[30] Foreign Application Priority Data

Mar. 10, 1984 [DE] Fed. Rep. of Germany ....... 3408899

[51] Int. Cl.$^4$ ............................................. F02B 27/00
[52] U.S. Cl. ................................................ 123/52 MV
[58] Field of Search ......... 123/52 M, 52 MV, 52 MB, 123/52MC

[56] References Cited

U.S. PATENT DOCUMENTS

| | | | |
|---|---|---|---|
| 2,845,912 | 8/1958 | Bird | 123/52 MV |
| 2,916,027 | 12/1959 | Chayne et al. | 123/52 MV |
| 3,026,861 | 3/1962 | Brown | 123/52 MV |
| 3,303,832 | 2/1967 | Platner et al. | 123/52 M |
| 4,409,934 | 10/1983 | Kaindl | 123/52 M |
| 4,510,896 | 4/1985 | Rutschmann | 123/52 MV |

Primary Examiner—Craig R. Feinberg
Attorney, Agent, or Firm—Barnes & Thornburg

[57] ABSTRACT

An air intake installation of a multicylinder internal combustion engine in which, for purposes of tuned-intake pressure-charging, a common air intake installation is arranged between two cylinder groups of a multicylinder internal combustion engine whose cylinders are in boxer or V-type arrangement; the air intake installation which is disposed symmetrically to the cylinder groups has its volumes and lengths so matched to the internal combustion engine that a good charging effect results from tuned-intake pressure-charging over a large rotational speed range of the engine.

5 Claims, 3 Drawing Figures

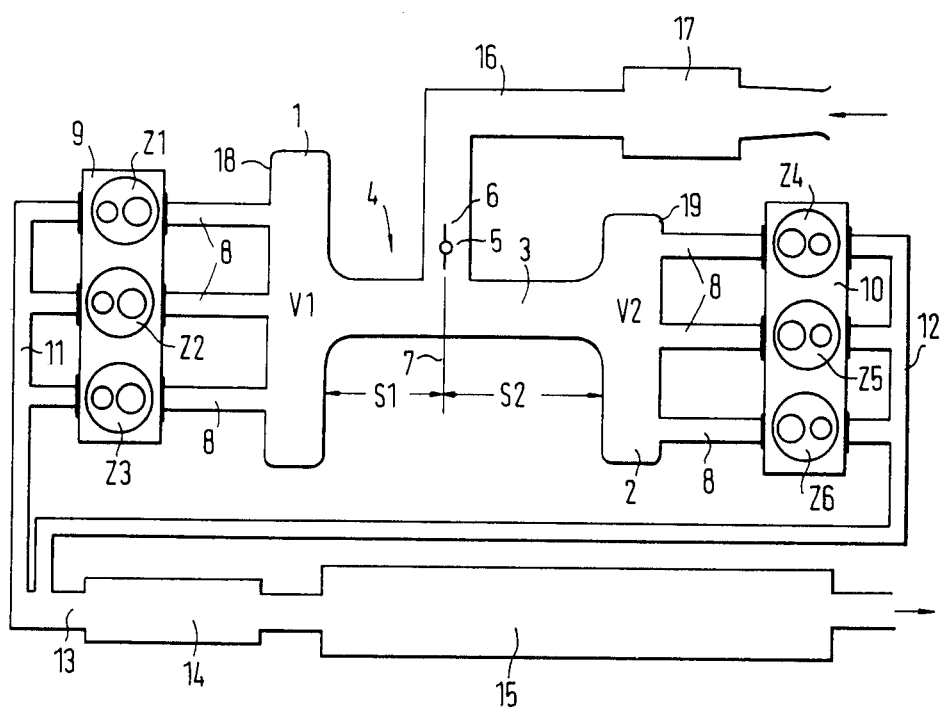

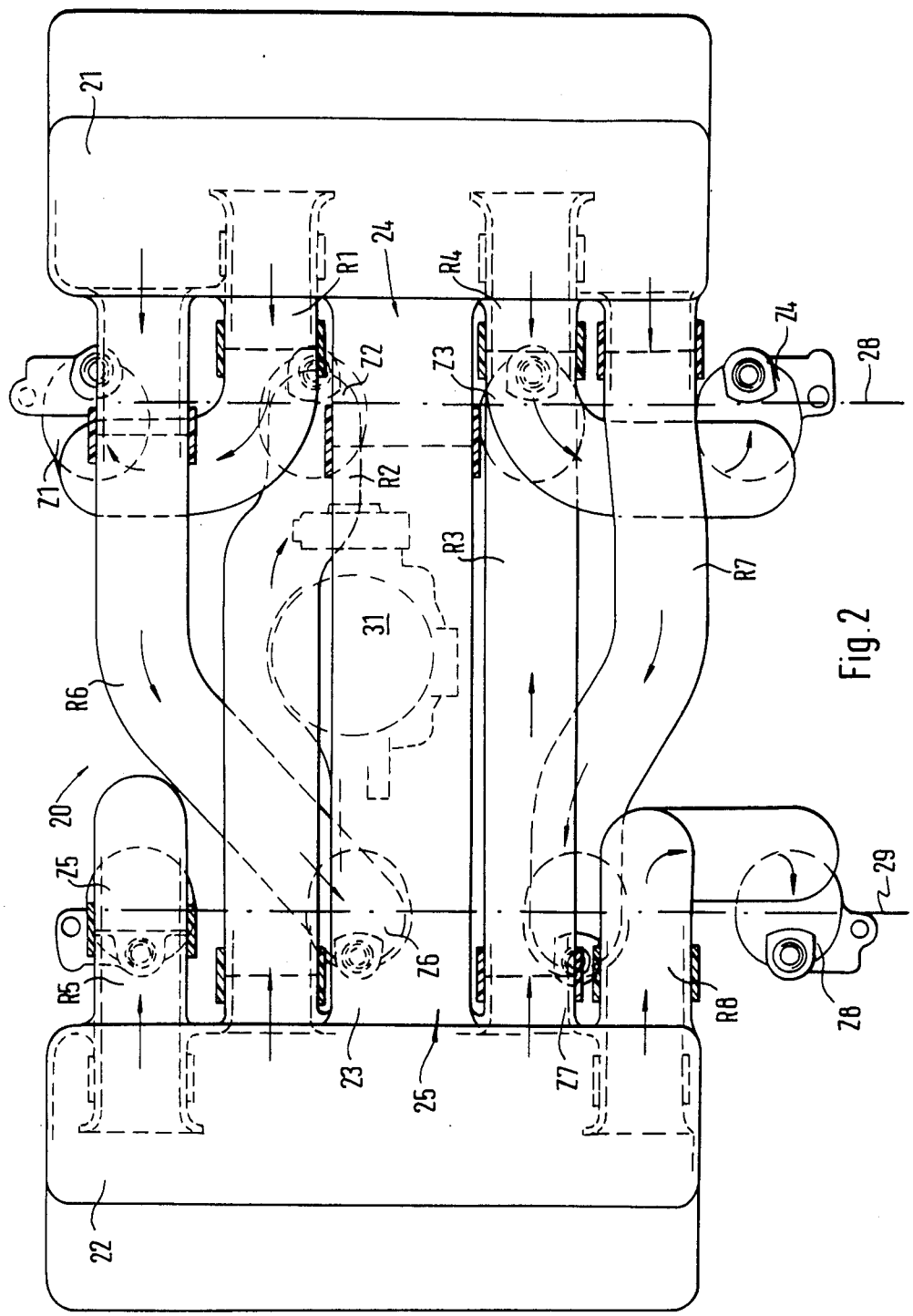

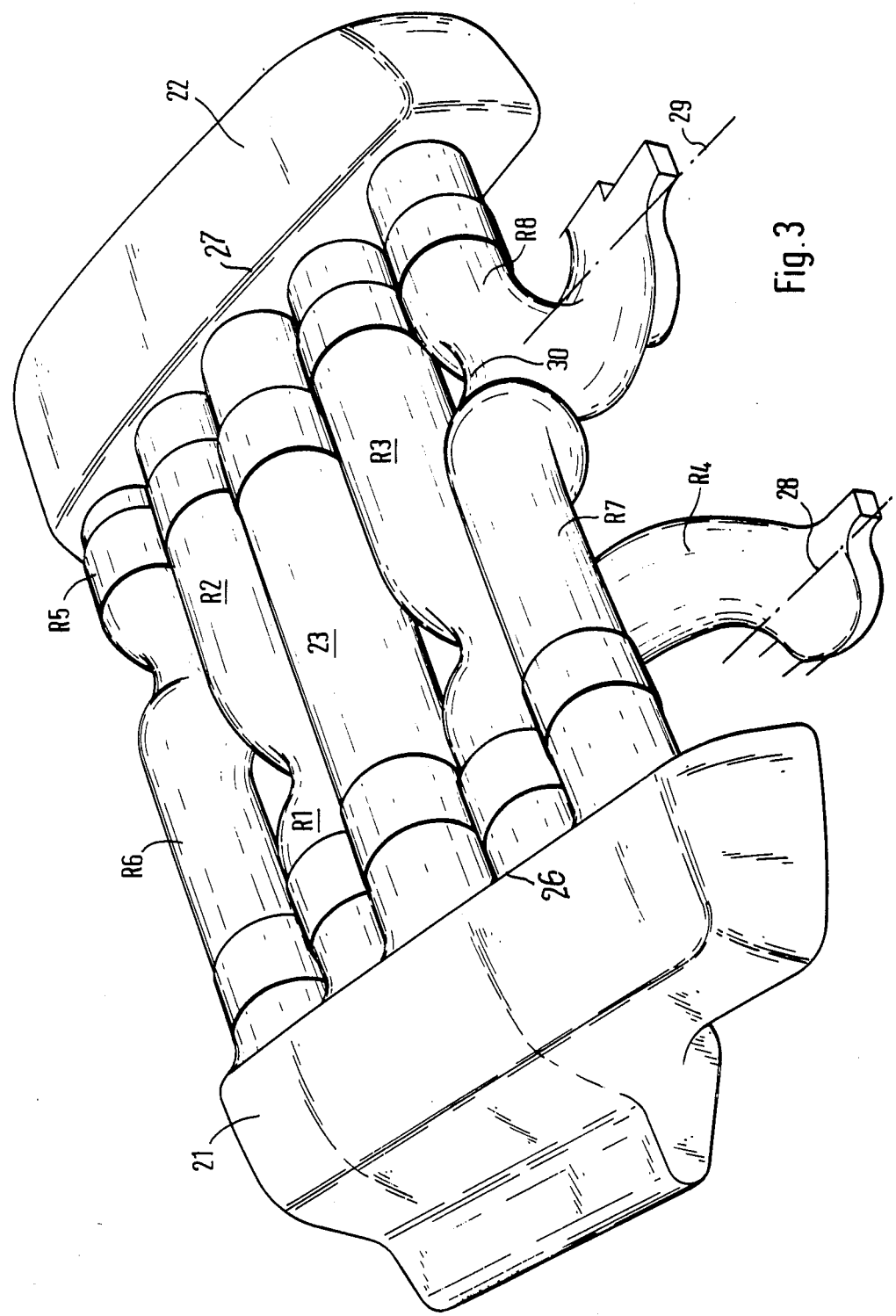

AIR INTAKE SYSTEM OF A MULTICYLINDER INTERNAL COMBUSTION ENGINE

The present invention relates to an air intake installation of a multicylinder internal combustion engine whose cylinders in a boxer of V-type arrangement are combined into two similar mutually opposite cylinder groups, between which is arranged a common air intake installation.

In a prior art internal combustion engine disclosed in the U.S. Pat. No. 1,761,958 with eight cylinders which are combined into two mutually opposite groups each having four cylinders, two cylinders of one group and two cylinders of the other group are supplied with suction air by an I-shaped manifold. Consequently, two such manifolds are necessary which include central suction connections disposed perpendicular thereto with throttle valves. This quite costly installation is required in order to assure a uniform filling of the cylinders.

The object of the present invention resides in achieving a cost reduction and output increase of the internal combustion engine by a particular configuration and dimensioning of such an air intake installation.

As solution to the underlying problems, the air intake installation of the present invention is constructed as tuned-intake, pressure-charging system in that the overall volume of the two resonance chambers is dimensioned approximately equal to the overall piston displacement of all cylinders. Since the volume of the resonance chamber coordinated to each cylinder group is approximately equal to the displacement of this cylinder group, similar resonance conditions can be fulfilled between the connecting pipe of the manifold and the resonance chambers as between the cylinders and the suction pipes leading to the same and starting from the resonance chambers. In this manner, it is possible to use only a single I-shaped manifold for an eight-cylinder internal combustion engine and to thus achieve a considerable cost economy. Additionally, a considerable output and torque increase can be achieved over a wide rotational speed range of the internal combustion engine which amounts up to 10% in some places.

The suction pipes are connected to the resonance chambers formed either at the same walls as the connecting pipe or aligned therewith at the oppositely disposed walls. In the former case, which is preferred for space reasons for internal combustion engines of V-type construction, the suction pipes extend curved and are of different lengths whereby the curvature and length are so matched to one another that an approximately equal pressure loss will result for all suction pipes during the through-flow.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic view of an air intake installation of a six-cylinder boxer-motor in accordance with the present invention;

FIG. 2 is a somewhat schematic view of an air intake installation of an eight-cylinder V-engine in accordance with the present invention; and FIG. 3 is a perspective view of the air intake installation according to FIG. 2, slightly modified.

Referring now to the drawing wherein like reference numerals are used throughout the various views to designate like parts, and more particularly to FIG. 1, an I-shaped manifold generally designated by reference numeral 4 is formed of a resonance chamber 1 having the volume V1, of a resonance chamber 2 having the volume V2 and of a connecting pipe 3. A suction connection 5 is connected perpendicularly to the connecting pipe 3, which contains a throttle valve 6. The center 7 of the intake connection 5 has the distance $S1=0.1$ meter to the resonance chamber 1 and the distance $S2=0.12$ meters to the resonance chamber 2. Corresponding to the ratio equation realized in the construction according to the present invention $$V1/V2 = S1/S1,$$

the volume $V1 = 1.8 \times 10^{-3} m^3$ and the volume $V2 = 1.5 \times 10^{-3} m^3$.

Three straight suction pipes 8 having a length $l=0.2$ m extend from the resonance chambers 1 and 2 which are disposed parallel to the connecting pipe 3 and which conically narrow in the direction toward the inlet channels of the two cylinder groups 9 and 10 formed of three cylinders each. The one cylinder group 9 includes the cylinders Z1, Z2, and Z3 while the other cylinder group 10 includes the cylinders Z4, Z5 and Z6.

The exhaust gases of the two cylinder groups 9 and 10 are fed by way of exhaust manifolds 11 and 12 to an exhaust line 13 and after flowing through a front muffler 14 and a main muffler 15, reach the atmosphere. The suction connection 5 is connected by way of a suction line 6 with an air filter 17, through which the air is sucked-in out of the atmosphere.

The cylinders Z1, Z6, Z2, Z4, Z5, Z3 suck air successively out of the resonance chambers corresponding to their ignition sequence, whereby a standing wave forms between the resonance chambers 1 and 2 with a zero point in the center 7 of the suction connection 5. Since the suction pipes 8 of the cylinders are connected to the resonance chambers 1 and 2 along the sides 18 and 19 opposite to the connecting pipe 3, an approximately diagonal throughflow through the manifold 4 will result during the intake which continues in the respective suction pipes.

In the air intake installation according to FIGS. 2 and 3, the manifold 20 consists of the resonance chambers 21 and 22, having the volumes V21 and V22, and of the connecting pipe 23. The manifold 20 is arranged between the two V-shaped oppositely disposed cylinder groups generally designated by reference numerals 24 and 25 of an eight-cylinder internal combustion engine whereby the cylinder group 24 includes the cylinders Z1, Z2, Z3, Z4, while the cylinder group 25 includes the cylinders Z5, Z6, Z7, Z8. Suction pipes R1 to R8 which lead to the cylinders, are all connected along the same sides 26 and 27 of the resonance chambers 21 and 22 as the connecting pipe 23. The suction pipes of the one cylinder group 24 terminate in the common flange plane 28 of the one cylinder head while the suction pipes of the other cylinder group 24 terminate in the flange plane 29 of the other cylinder head. The two inner cylinders Z2 and Z3 of the cylinder group 24 are connected by slightly curved suction pipes R2 and R3 to the resonance chamber 22 adjacent the other cylinder group 25. Suction pipes R6 and R7 lead to the inner cylinders Z6 and Z7 of the cylinder group 25, which start from the resonance chamber 21 adjacent the cylinder group 24. In contrast thereto, the outer cylinders Z1 and Z4 as well as Z5 and Z8 are connected by suction pipes R1 and R4 as well as R5 and R8 to the resonance chamber 21, respectively, 22 adjacent thereto. These suction pipes R1, R4, R5, and R8 are shorter than the inner suction pipes and have a more pronounced curvature which may amount to a 180°-deflection. In order to obtain a sufficient suction pipe length, the suction pipes R1, R4, R5 and R8 extend a certain distance into the interior of the resonance chambers 21 and 22. One shorter and one longer suction pipe coaxial thereto and connected to the other resonance chamber are each cast together into a unitary casting, whereby the gate mark is reinforced by a rib 30 (FIG. 3). Centrally at the connecting pipe 23 a suction connection 31 branches off perpendicularly, by way of which the air is sucked-in from an air filter (not shown).

In addition to the size of the volumes V1, V2, respectively, V21, V22 of the resonance chambers, the overall length l of the flow path from the inlet valve of the one cylinder group to the successively opening inlet valve of the other cylinder group is decisive for the resonance tuning. If the sum of the flow cross sections of the suction pipes leading to one cylinder group is made equal to the flow cross section of the connecting pipe, the tuned-intake pressure-charging can be realized optimally and can also be determined by calculations. In this case, the following relation is valid between the resonance rotational speed n, i.e., the rotational speed at which resonance occurs between the internal combustion engine and the natural frequency of the air intake installation:

$$\text{tangent} \frac{\pi \cdot l}{c} \cdot \frac{n \cdot z}{240} = \frac{f \cdot c \cdot 120}{V \cdot \pi \cdot n \cdot z}$$

wherein:
$\pi = 3.14$
l = overall flow path [m]
c = sound velocity of the intake air [m/s] $\approx$ 340 m/s
n = rotational speed of internal combustion engine [1/min].
z = number of the cylinders
V = cylinder volume [m$^3$] connected on the average per time to the connecting pipe.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An air intake installation of a multi-cylinder internal combustion engine having an overall cylinder displacement and whose cylinders are combined into similar mutually oppositely disposed cylinder groups, comprising a substantially I-shaped manifold means arranged between said cylinder groups as common air intake means including two approximately equally large resonance chamber means and a connecting pipe means therebetween, one resonance chamber means being adjacent each cylinder group, suction pipes connecting a respective resonance chamber means at sides thereof disposed opposite connecting places of the connecting pipe means with individual cylinders of the corresponding cylinder group, the air intake means being constructed as tuned-intake, pressure-charging system in that overall volume of the resonance chamber means is approximately equal to overall displacement of all cylinders of the internal combustion engine, a suction connection terminating approximately perpendicularly in the connecting pipe means, the center of the suction connection having a first distance to the one resonance chamber means and a larger distance to the other resonance chamber means, and wherein between a volume of each of the two resonance chamber means and the distances, the following relation exists:

$$V1/V2 = S2/S1$$

wherein V1 and V2 are the volumes of the one and other resonance chamber means and S2 is the distance from the center of the suction connection to the other resonance chamber means, while S1 is the distance from the center of the suction connection to the one resonance chamber means.

2. An air intake installation according to claim 1, wherein the suction pipes narrow conically in a direction toward the cylinders.

3. An air intake installation of an eight-cylinder internal combustion engine having an overall cylinder displacement and whose cylinders are combined into similar mutually oppositely disposed cylinder groups, comprising a substantially I-shaped manifold means arranged between said cylinder groups as common air intake means including two approximately equally large resonance chamber means and a connecting pipe means therebetween, one resonance chamber means being adjacent each cylinder group, suction pipes connecting a respective resonance chamber means with the individual cylinders of the corresponding cylinder group at same sides of the resonance chamber means as the connecting pipe means and wherein the suction pipes of the two inner cylinders of each cylinder group are slightly curved and connected to the resonance chamber means adjacent the opposite cylinder group, whereas the suction pipes of the two outer cylinders are strongly curved shorter suction pipes having an approximately 180° deflection and are connected to the resonance chamber means adjacent thereto, and wherein the strongly curved suction pipes protrude a greater distance into the resonsance chamber means than the slightly curved suction pipes, and the air intake means being constructed as tuned-intake, pressure-charging system in that overall volume of the resonance chamber means is approximately equal to overall displacement of all cylinders of the internal combustion engine.

4. An air intake installation of a multi-cylinder internal combustion engine having an overall cylinder displacement and whose cylinders are combined into similar mutually oppositely disposed cylinder groups, comprising a substantially I-shaped manifold means arranged between said cylinder groups as common air intake means including two approximately equally large resonance chamber means and a connecting pipe means therebetween, one resonance chamber means being adjacent each cylinder group, suction pipes connecting a respective resonance chamber means with individual cylinders of the corresponding cylinder group, a suction connection terminating approximately perpendicularly in the connecting pipe means, the center of the suction connection having a first distance to the one resonance chamber means and a larger distance to the other resonance chamber means, the air intake means being constructed as tuned-intake, pressure-charging system in that overall volume of the resonance chamber means is approximately equal to overall displacement of all cylinders of the internal combustion engine, and wherein between a volume of each of the two resonance chamber means and the distances, the following relation exists:

$$V1/V2 = S2/S1$$

wherein V1 and V2 are the volumes of the one and other resonance chamber means and S2 is the distance from the center of the suction connection to the other resonance chamber means, while S1 is the distance from the center of the suction connection to the one resonance chamber means.

5. An air intake installation of a multi-cylinder internal combustion engine having an overall cylinder displacement and whose cylinders are combined into similar mutually oppositely disposed cylinder groups, comprising a substantially I-shaped manifold means arranged between said cylinder groups as common air intake means including two approximately equally large resonance chamber means and a connecting pipe means therebetween, one resonance chamber means being adjacent each cylinder group, suction pipes connecting a respective resonance chamber means with individual cylinders of the corresponding cylinder group, the air intake means being constructed as tuned-intake, pressure-charging system in that overall volume of the resonance chamber means is approximately equal to overall displacement of all cylinders of the internal combustion engine, wherein the suction pipes which lead to two inner cylinders of each cylinder group are slightly curved, whereas the suction pipes that lead to two outer cylinders of each cylinder group are strongly curved and shorter, having an approximately 180° deflection, and wherein the strongly curved suction pipes protrude a greater distance into the resonance chamber means than the slightly curved suction pipes.

* * * * *